Figure 2:
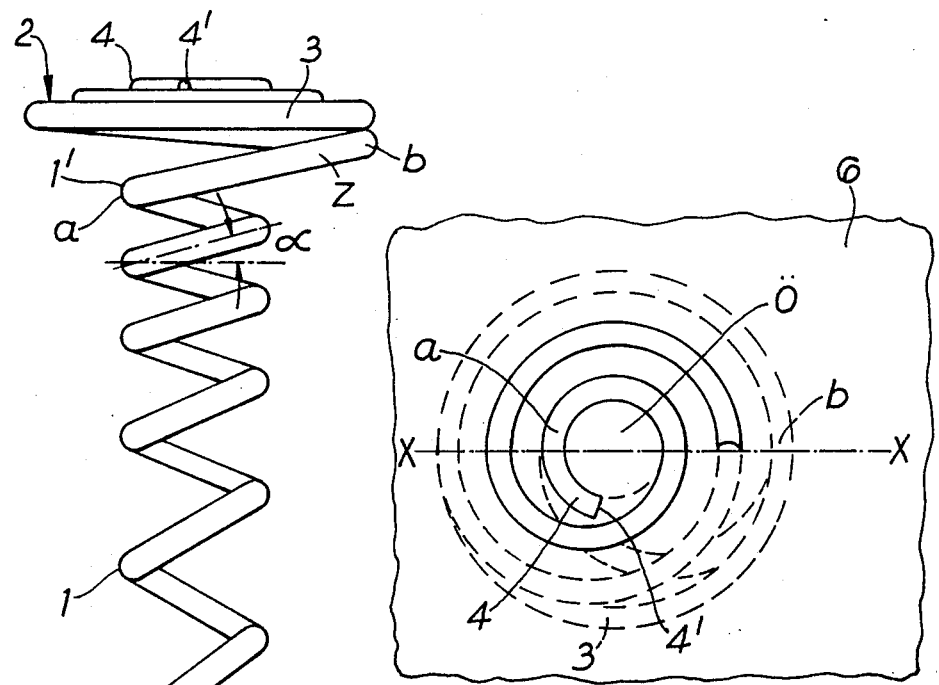

United States Patent [19]

Bronn

[11] Patent Number: 4,917,554
[45] Date of Patent: Apr. 17, 1990

[54] SCREW UNIT TO JOIN SEMI-RIGID MATS TOGETHER

[75] Inventor: Walter Bronn, Arpke, Fed. Rep. of Germany

[73] Assignee: Cryotherm Limited, Leeds, England

[21] Appl. No.: 330,119

[22] Filed: Mar. 29, 1989

[30] Foreign Application Priority Data

Apr. 9, 1988 [GB] United Kingdom ............... 8808369

[51] Int. Cl.⁴ .......................................... F16B 35/00
[52] U.S. Cl. .................................. 411/392; 411/413; 411/438
[58] Field of Search .................... 411/16-18, 411/392, 438, 916, 412, 413, 403; 81/3.45

[56] References Cited

U.S. PATENT DOCUMENTS

| | | | |
|---|---|---|---|
| 2,138,919 | 12/1938 | Herman | 411/438 |
| 2,391,792 | 12/1945 | Miles et al. | 411/16 |
| 2,755,699 | 7/1956 | Forster | 411/438 |
| 4,437,286 | 3/1984 | Maguire | 411/438 |
| 4,762,453 | 8/1988 | DeCaro | 411/392 |

FOREIGN PATENT DOCUMENTS

| | | | |
|---|---|---|---|
| 118947 | 3/1970 | Norway | 411/392 |
| 280648 | 11/1927 | United Kingdom | 81/3.45 |

Primary Examiner—Neill R. Wilson
Attorney, Agent, or Firm—R. A. Giangiorgi

[57] ABSTRACT

A screw unit with a shaft (1) and an enlargement at one end, to join together semi-rigid mats, consisting for example of mineral fibers or foam material, has the shaft (1) consisting of a wire helix (W) wound in corkscrew fashion and continuing at the one end as a spiral winding forming the headpiece (2), with the helical slope ($\alpha$) of the wire helix (W) adjacent the headpiece (2) being smaller than the helical slope ($\beta$) in the region of a point (5) at the other end of the shaft (1).

17 Claims, 1 Drawing Sheet

U.S. Patent     Apr. 17, 1990     4,917,554

SCREW UNIT TO JOIN SEMI-RIGID MATS TOGETHER

The invention relates to a screw unit with a shaft and an enlargement at one end, to join together semi-rigid mats consisting for example of mineral fibers or foam material.

The attachment of thermally-insulating mats to walls or the like takes place as a rule by means of screws or by nailing-on. If several layers of mats are to be provided however, the attachment of the subsequent mats is difficult. The nails used for this purpose are usually simply bent over to improve the hold, and this involves a not inconsiderable compression of the material, so that the insulation values are variable. It is also desirable to protected I-section girders etc., from the effect of overheating by fire, by cladding girders in such thermally insulating mats.

A screw unit is known from the registered documents of German registered design 80 07 738 that has such a length that several mats can be simultaneously held. A fastening of this nature however produces at best a fixing to a rigid support, and does not bond the individual mats to one another. Starting from an enlargement at its head end, this screw unit terminates in an end that can be driven or screwed in, subsequent only to a smooth shaft. It consists of a basically uniform, short-length helix. Other proposals are described in GB 2,186,937, GB 1,263,973, GB 737,488, GB 692,102, GB 691,793, GB 665,492, GB 648,437, GB 569,627 and EP 20162984 but these have disadvantages of one form or another from the manufacturing and/or installation and/or functional viewpoints.

It is the basic problem of the invention to disclose a screw unit that makes possible the permanent bonding of mats arranged in several layers whilst protecting their structure.

According to the present invention, there is provided a screw unit for joining together semi-rigid mats, consisting for example of mineral fibers or foam material, the unit comprising a shaft and an enlargement at one end of the shaft, and the shaft consisting of a wire helix wound in corkscrew fashion and continuing at the one end into the enlargement as a spiral winding forming a headpiece, with the helical slope of the wire helix adjacent the headpiece being smaller than the helical slope in the region of a point at the other end of the shaft.

With such a screw unit the individual mats etc can be bonded to one another easily and quickly. The wire helix, wound like a corkscrew, pierces through the mats of mineral fiber or foam material without any deleterious change of their structure. As the wire helix continues as a winding having the nature of a spiral spring, forming the headpieces of the screw unit, the pulling-in caused by the screwing can partially extend to the headpiece, so that a part of it is involved in the anchoring.

The screw unit according to the invention also possesses the advantage that its cost of manufacuture is small as all of it, from point to head, can be manufactured from a single, cut-to-length piece of wire. Thus the formation of a head by upsetting or welding need not be considered.

Figures 1, 3:
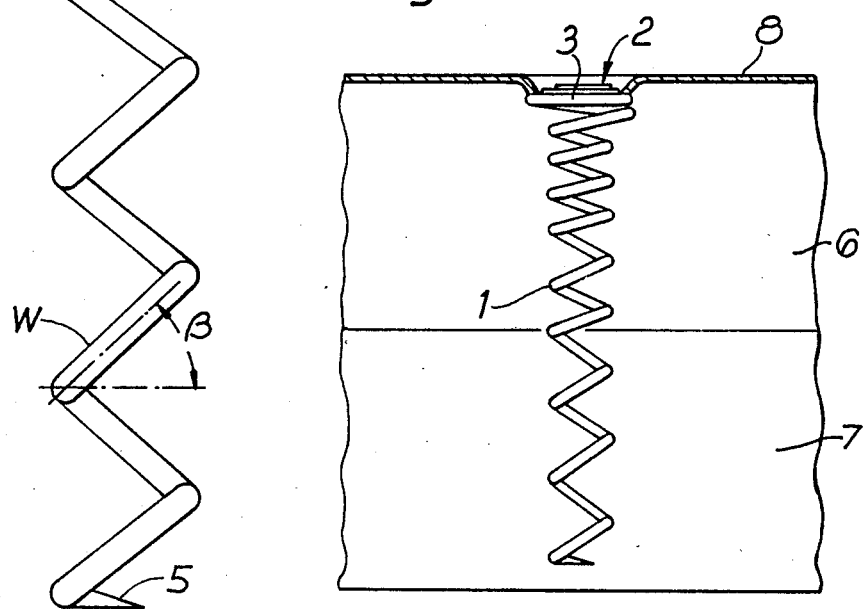

There are various detailed possibilities of developing and improving the screw unit according to the invention which are explained in the following in conjunction with the drawing, which shows:

FIG. 1 on an enlarged scale, a side view of a screw unit according to the invention, FIG. 2 a plan view in the screwed-in condition of the screw unit represented in FIG. 1, and FIG. 3 at approximately actual size, a side view of the screw unit according to the invention this being in the inserted condition.

The screw unit represented in the Figures serves to bind together semi-rigid mats 6, 7, for example of mineral fibers or foam material, and consists in basic construction of a shaft 1 and an enlargement, namely a headpiece 2, at the upper end.

The shaft 1 consists of a wire helix W wound like a corkscrew, the wire helix W continuing at the upper end as a spiral winding—of the nature of a spiral spring—forming the headpiece 2. The shaft 1 of the screw unit is kept basically cylindrical; the core of the helix has an aperture diameter that is about five times the diameter of the wire W.

As FIG. 1 shows, the upper end of the wire helix W, or the upper end 1' of the shaft 1, passes, via an outwardly-directed intermediate portion Z, into the headpiece 2, and the spiral winding extends from the outside inwards. Shaft end a of intermediate portion Z lies diametrically opposite to point b where the latter merges into largest turn 3 of the winding that forms the headpiece 2. The points of connection are indicated in FIG. 2 by x—x. In the merging area the intermediate portion Z and the largest turn 3 of the winding that forms the headpiece 2 lie against one another. The winding turns that become smaller from outside to inside join up with the spiral turn surrounding the headpiece 2 (the outermost winding turn). The innermost spiral winding turn 4 lies in an axial direction directly over the wire helix W that forms the shaft. An obvious alternative is that the winding could be from inside to outside.

As is seen from FIG. 1, the winding turns that are of the nature of a spiral spring are so fashioned that they form a headpiece 2 that has the shape of the frustrum of a cone. The innermost winding turn 4 surmounts the outermost winding turn 3 that forms the base of this cone, in the opposite direction to the wire helix W that forms the shaft.

Also it can be seen from FIG. 2 that the innermost turn 4 of the spiral winding is constructed as a circular engagement opening O for a tool. The associated tool, which is not shown, possesses a lever or flat that acts against the radially-positioned end face 4' of the innermost winding turn 4. It is not shown that the opening O instead of being circular could also be so shaped that it forms a polygonal opening, while if the winding is from inside to outside, the end face 4' is provided at an end of the outmost turn.

In the screw unit according to the invention the clear spacing between the individual terms of the spiral winding is preferably about equal to the diameter of the wire W.

As can be seen from FIG. 1, the helical slope $\alpha$ at the upper end of the wire helix W is smaller than the helical slope $\beta$ in the region of the point. At the point end of the wire helix W the helical slope $\alpha$ amounts to some 15°, whilst in the region of the point the helical slope $\beta$ amounts to some 40°. The change from the helical slope $\beta$ at the upper end to the helical slope $\beta$ in the region of the point may be continuous, or it may be such that it takes place at intervals, so that there are always several helix turns that possess the same helical slope.

As FIG. 1 in particular shows, the point 5 of the screw unit is obtained simply by sharpening the end of the wire helix W.

To join together two mats 6 and 7 of mineral fibers of foam material, the screw unit according to the invention is screwed in vertically to the plane of the two mats 6, 7 laid one upon the other. On account of the greater helical slope in the region of the point 5 the initial inward movement of the screw unit is relatively rapid, while the lower-sloped helix at the upper end advantageously brings about a certain consolidation of the structure. As the wire helix W that forms the shaft 1 of the screw unit according to the invention changes over in the same direction of winding into the spiral winding that forms the headpiece 2, the intermediate portion Z, should this be so intended, also sinks below the surface 8 of the mat. Portions of the mat 6 become jammed between the large winding turn 3 and the intermediate portion Z running upwards from below. From this a clamping action results such that even considerable mechanical loadings do not lead to a loosening of the screw unit. It is moreover even possible to screw in the screw unit so far that the headpiece 2 becomes submerged in the mat 6, as is represented in FIG. 3, thus it practically disappears from sight in the mat 6.

Regarding the dimensions of the screw unit according to the invention it can be that the wire W has a diameter of about 0.5 to 5.0 mm, preferably of about 1.0 to 2.5 mm, and/or that the wire helix W has a length of about 20 to 500 mm, preferably of about 40 to 100 mm, and/or that the headpiece 2 has a diameter of about 10 to 100 mm, preferably of about 20 to 50 mm, and/or that the ratio of the length of the wire helix W to the diameter of the headpiece 2 amounts to about 2:1 to 10:1, preferably about 3:1 to 8:1.

Finally it may be pointed out that the wire W for the screw unit according to the invention preferably consists of galvanized or stainless spring steel wire.

What I claim is:

1. A screw unit for joining together semi-rigid mats, consisting for example of mineral fibers or foam material, comprising a shaft and an enlargement at one end of said shaft, with said shaft consisting of a wire helix wound in corkscrew fashion, having a longitudinal axis, and continuing at said one end into said enlargement as a spiral winding forming a headpiece, with the helix angle of said wire helix adjacent said headpiece and with respect to said longitudinal axis being smaller than the helix angle of said wire helix in the region of the other end of said shaft, and with at least a portion of said enlargement extending orthogonally with respect to said longitudinal axis and having a relatively short axial length such that said enlargement is prevented from projecting beyond an adjacent surface of one of said mats.

2. A screw unit according to claim 1, wherein said end of said wire helix adjacent said headpiece passes over via an outwardly-directed intermediate portion into the headpiece, and the said winding spiral extends from the outside to the inside of said spiral.

3. A screw unit for joining together semi-rigid mats, consisting for example of mineral fibers or foam material, comprising a shaft and an enlargement at one end of said shaft, with said shaft consisting of a wire helix wound in corkscrew fashion and having a longitudinal axis, continuing at said one end into the helix angle of said wire helix adjacent said headpiece and with respect to said longitudinal axis being smaller than the helix angle of said wire helix in the region of the other end of said shaft wherein said headpiece is fashioned as a frustrum of a shallow cone.

4. A screw unit according to claim 1, wherein at least one abutment surface is provided on said spiral winding for engagement by a tool to apply a fastening torque to said screw unit.

5. A screw unit for joining together semi-rigid mats, consisting for example of mineral fibers or foam material, comprising a shaft and an enlargement at one end of said shaft, with said shaft consisting of a wire helix wound in corkscrew fashion and having a longitudinal axis, continuing at said one end into said enlargement as a spiral winding forming a headpiece, with the helix angle of said wire helix adjacent said headpiece and with respect to said longitudinal axis being smaller than the helix angle of said wire helix in the region of the other end of said shaft, wherein at least one abutment surface is provided on said spiral winding for engagement by a tool to apply a fastening torque to said screw unit and said headpiece is wound from outside to inside and said abutment surface is provided at said inside.

6. A screw unit for joining together semi-rigid mats, consisting for example of mineral fibers or foam material, comprising a shaft and an enlargement at one end of said shaft, with said shaft consisting of a wire helix wound in corkscrew fashion and having a longitudinal axis, continuing at said one end into said enlargement as a spiral winding forming a headpiece, with the helix angle of said wire helix adjacent said headpiece and with respect to said longitudinal axis being smaller than the helix angle of said wire helix in the region of the other end of said shaft, wherein at least one abutment surface is provided on said spiral winding for engagement by a tool to apply a fastening torque to said screw unit and an innermost turn of said spiral winding is constructed as an engagement opening for said tool.

7. A screw unit according to claim 6, wherein said engagement opening is circular.

8. A screw unit according to claim 1, wherein said wire helix has a diameter of 0.5 to 5.0 mm.

9. A screw unit according to claim 8, wherein said wire helix has a diameter of 1.0 to 2.5 mm.

10. A screw unit according to claim 1, wherein said wire helix has a length of 20 to 500 mm.

11. A screw unit according to claim 10, wherein said wire helix has a length of 40 to 100 mm.

12. A screw unit according to claim 1, wherein said headpiece has a diameter of 10 to 100 mm.

13. A screw unit according to claim 12, wherein said headpiece has a diameter of 20 to 50 mm.

14. A screw unit according to claim 1, wherein the ratio of the length of said wire helix to the diameter of said headpiece is 2:1 to 10:1.

15. A screw unit according to claim 14, wherein the ratio of the length of said wire helix to the diameter of said headpiece is 3:1 to 8:1.

16. A screw unit according to claim 1, wherein said wire helix consists of galvanised steel wire.

17. A screw unit according to claim 1, wherein said wire helix consists of stainless steel wire.

* * * * *